US00RE35604E

United States Patent [19]

McDonough, Jr.

[11] E Patent Number: Re. 35,604

[45] Reissued Date of Patent: Sep. 16, 1997

[54] RAKE APPARATUS

[76] Inventor: John T. McDonough, Jr., 1121 27 St. NW., Fargo, N. Dak. 58102

[21] Appl. No.: 285,222

[22] Filed: Aug. 3, 1994

Related U.S. Patent Documents

Reissue of:

[64] Patent No.: 5,249,413
Issued: Oct. 5, 1993
Appl. No.: 823,190
Filed: Jan. 21, 1992

[51] Int. Cl.[6] ..... A01D 7/06

[52] U.S. Cl. ..... 56/400.16; 56/400.2

[58] Field of Search ..... 56/400.01, 400.16, 56/400.19, 400.2

[56] References Cited

U.S. PATENT DOCUMENTS 3,264,810 8/1966 Lowell ..... 56/400.16
4,351,145 9/1982 Farkas ..... 56/400.16
5,099,638 3/1992 Bass ..... 56/400.16

*Primary Examiner*—Terry Lee Melius
*Attorney, Agent, or Firm*—Robert E. Kleve

[57] ABSTRACT

The invention comprises a rake apparatus having a handle with three rake heads. The first rake head is fixed to one end of the handle. The second rake head is pivotally mounted to the first rake head, and the third rake head is pivotally mounted to the second rake head. The rake heads each have elongated rake times mounted to the heads at one of the ends of the tines with the tines bent laterally at their other ends, and with the rake heads mounted one in front of the other. Spring means are provided between the first and second rake heads and the second and third rake heads to urge the second and third rake heads into parallel relation to the first rake head.

3 Claims, 1 Drawing Sheet

RAKE APPARATUS

Matter enclosed in heavy brackets [ ] appears in the original patent but forms no part of this reissue specification; matter printed in italics indicates the additions made by reissue.

This invention relates to rake apparatus. It is an object of the invention to provides a novel rake device having a plurality of rake heads, with each rake head having a plurality of resilient rake tines, and with at least one of the rake heads being movable to an angle with respect to the other rake heads, and with each of the rake tines extending downward at their ends for engaging the ground in at least a somewhat perpendicular direction when drawing the rake along the ground in an arc, and with the movable rake head enabling the tines of that head to remain more perpendicular to the ground longer, to provide a more penetrating engagement of the tines with objects on the ground for better raking.

It is another object of the invention to provide a novel rake having a handle with a fixed rake head at one end with a plurality of rake tines mounted at their one ends to the rake head, and with at least two pivotally mounted rake heads pivotally mounted in a row in front of one another and with these other head heads having rake tines, and with all the rake heads having laterally bent ends, and with spring means urging the at least two rake heads into parallelism with the first rake head.

It is another object of the invention to provide a novel rake having a plurality of rake heads each with tines mounted in a row laterally across in front of the tines in the next head, to provide a series of raking operations in one rake with each rake head.

Further objects and advantages of the invention will become apparent as the description proceeds and when taken in conjunction with the accompanying drawing wherein:

BRIEF DESCRIPTION OF PREFERRED EMBODIMENT

Briefly stated, the invention comprises a rake apparatus having a handle, with three rake heads, one of the rake heads being fixed to the handle at one end, the second rake head being pivotally mounted to the one rake head, and the third rake head being pivotally mounted to the second rake head, a pair of compression springs mounted to urge the second rake head into parallism with the one rake head, and a second pair of compression springs mounted to urge the third rake head into parallelism with the second rake head, each of the rake heads having a plurality of resilient elongated rake tines mounted at their one ends in a row in each rake head, and having laterally bent ends at their other ends and with the heads mounted in a row, one in front of the next.

Figure 1:
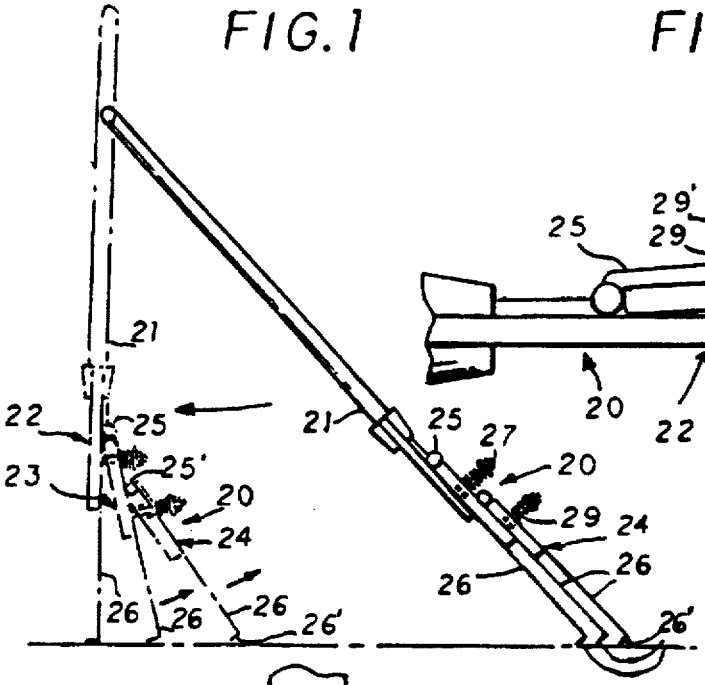
FIG. 1 is a side elevational view of the rake invention, illustrating the rake invention, prior to the drawing raking stroke in solid lines, and illustrating the rake invention after the rake invention has been swung by the operator in an approximate arc about the axis of an upper portion of the handle, and the pivotally mounted rake heads have pivoted back toward the beginning of the stroke, thereby enabling the lateral tines to remain more perpendicular to the ground longer for more effective penetration of the tines, to illustrate their approximate position near the completion of the raking stroke, and shown in phantom lines.
Figure 2:
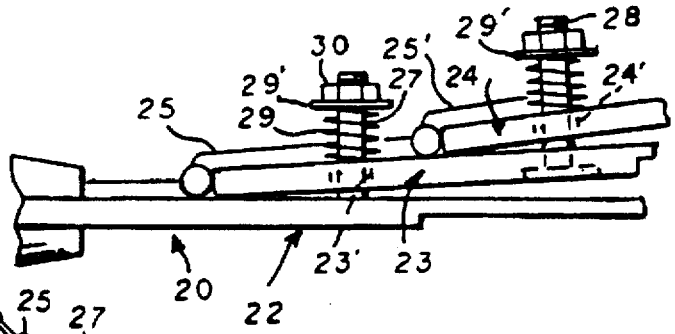
FIG. 2 is an enlarged side elevational view of the rake invention, illustrating the three rake heads of the invention, with one of the rake heads fixed to one end of a handle, and with the other two rake heads pivotally mounted in a row in front of the first rake head, and with spring means urging the other two rake heads into parallelism with the first rake head about the pivotal mounting.

Referring more particularly to the drawing, in FIGS. 1 and 2, the rake invention 20 is illustrated having a handle 21 with a rake head 22 fixed to one end of the handle, a rake head 23 pivotally mounted to the rake head 22, and a rake head 24 pivotally mounted to rake head 23. A pair of hinges 25 pivotally connect the rake head 22 to the rake head 21, and a pair of hinges 25' pivotally connect the rake head 24 to rake head 23. The rake heads are mounted one in front of the next in a row, and each of the rake heads have a plurality of resilient elongated rake tines 26 made of plastic or metal with resiliency. Each of the rake tines have laterally bent end portions 26'. The rake tines have their other ends, opposite the lateral bend end portions, fixed to their respective rake heads.

Figure 3:
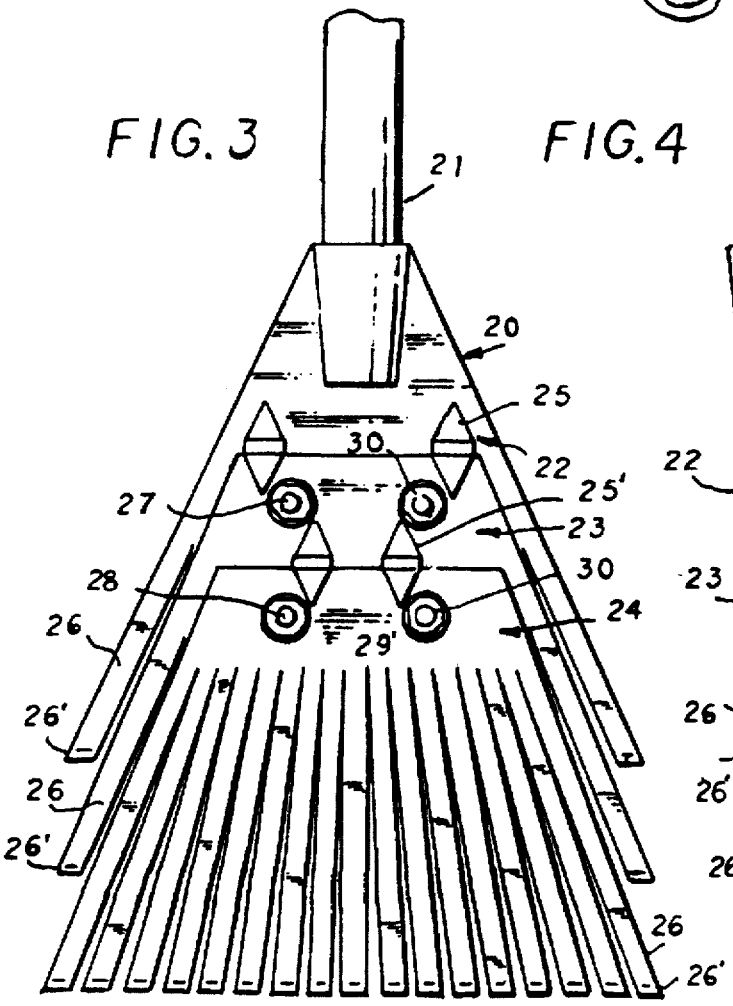
FIG. 3 is an edge view of the rake invention, taken along line 3—3 of FIG. 2.
Figure 4:
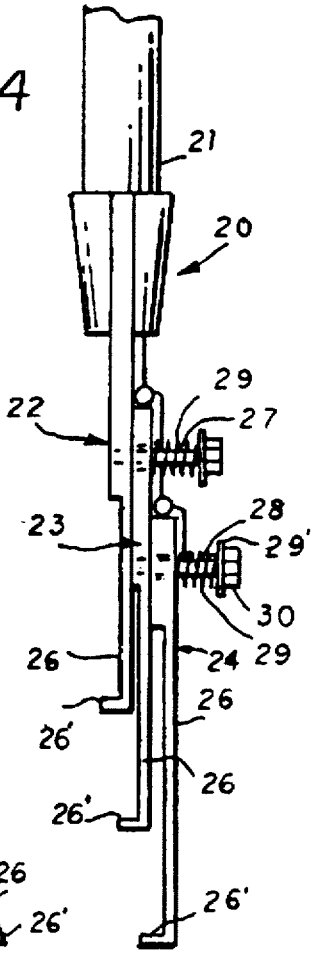
FIG. 4 is a further enlarged fragmentary edge view of the rake invention illustrating the spring biased pivotal mounting of the second rake head to the first rake head, and the third rake head to the second rake head.

A pair of threaded rods 27 are fixed to the rake head 22 and project through slots 23' in the rake head 23, and a pair of threaded rods 28 are fixed to rake head 23 and project through slots 24' in rake head 24. Each of the rods have springs 29 mounted over the rods with washers 29', larger than the springs 29, mounted on the rods; and threaded nuts 30 are threaded onto the rods to engage the washers and compress the springs sufficiently to spring bias the rake heads into their parallel position illustrated in FIG. 2, 3 and 4.

The springs 29 can be compressable a sufficient distance to enable the rake head 23 to pivot approximately 15 degrees away from rake head 22, under manual pressure with the springs pushing the head 23 back to parallelism with rake 22 upon release of the manual pressure. Similarly, the springs 29 can be compressable sufficiently to enable rake head 24 to pivot approximately 15 degrees away from the rake head 24 under manual pressure and returnable to parallelism with rake head 23 upon release of the manual pressure.

Operation

The rake apparatus 20 will be operated approximately as follows;

The operator of the rake invention 20 will take the rake invention by the handle, and will manually in a normal raking stroke, swing the rake in an arc drawing it generally toward the operator, from its position shown in solid lines in FIG. 1, to its position shown in phantom lines in FIG. 1, moving the rake from right to left.

In beginning the stroke, the operator will place the rake invention approximately as illustrated, with laterally bent ends of the rake tines directed at least somewhat perpendicular to the ground and will compress the rake heads downward into the ground somewhat to assure engagement with any leaves or grass on the ground, or other objects, and will draw the rake toward him maintaining this light downward pressure on the rake heads and tines.

The operator, in applying downward pressure on the rake heads, through the pressure on the rake tines on each head as the rake is swung clockwise, as illustrated, will place drag on the tines and heads of the tines of the pivotally mounted heads dragging then back counterclockwise so that these heads pivot counterclockwise overcoming the spring pressure and thereby pivot counterclockwise away from one another so as to remain at a forward angle longer, thereby maintaining the laterally bent ends of the tines directed downward longer for a more effective engagement with the leaves and grass and other objects on the ground and thereby provide a better raking operation.

Also, by the raking heads engaging objects on the ground, by the tines in one head raking the ground, then the tines in the next head raking the same approximate area, immediately after, and then the tines in the third head raking the same approximate area, in a row, the same area is in effect being raked three times for a more effective raking operation.

After the raking stroke is complete and any manual pressure upon the tine heads is removed and the apparatus is held above the ground; the pivoting tine heads, particularly the third tine head, under spring pressure will to snap back, in their pivotal movement, to their original parallism position; and this action tends to dislodge leaves that may be stuck on or between the tines.

It will be obvious that various changes and departures may be made to the invention without departing from the spirit and scope thereof, and accordingly, it is not intended that the invention be limited to that specifically described in the specification or as illustrated in the drawing, but only as set forth in the appended claims wherein.

What is claimed is:

1. A rake device comprising an elongated handle, a plurality of rake heads each having a plurality of resilient elongated rake tines mounted in the heads in a row at their one ends and having laterally bent other ends, one of said rake heads being fixed to the handle, at least a second rake head pivotally mounted to the first rake head and a third rake head pivotally mounted to the second rake head, spring means urging said rake heads into parallelism with one another, stop means on the spring means limiting the pivotal movement of the rake heads with respect to one another.

2. A rake device comprising an elongated handle, a plurality of rake heads each having a plurality of resilient elongated rake tines mounted in the heads in a row at their one ends and having laterally bent other ends, one of said rake heads being fixed to the handle, at least a second rake head pivotally mounted to the first rake head and a third rake head pivotally mounted to the second rake head, resilient means urging said rake heads into parallelism with one another, stop means limiting the pivotal movement of the rake heads with respect to one another.

*3. A rake device comprising an elongated handle, a plurality of rake heads each having a plurality of resilient elongated rake tines mounted in the heads in a row at their one ends and having laterally bent other ends, one of said rake heads being fixed to the handle, another of said rake heads pivotally mounted to said one rake head, resilient means urging said another rake head pivotally into parallelism with said one rake head, stop means limiting the pivotal movement of said another rake head away with respect to the one rake head.*

* * * * *